United States Patent

King et al.

[11] 4,327,312
[45] Apr. 27, 1982

[54] CIRCULAR RASTER SWEEP GENERATOR

[76] Inventors: Don G. King, 1031 Shadow Wood, Lewisville, Tex. 75067; Bill B. Bennett, 1101 Lopo Rd., Lewisville, Tex. 75028

[21] Appl. No.: 159,613

[22] Filed: Jun. 16, 1980

[51] Int. Cl.$^3$ ............................................... H01J 29/78
[52] U.S. Cl. .................................... 315/378; 315/367; 315/393; 358/87
[58] Field of Search .................. 315/367, 378, 393; 358/87

[56] References Cited

U.S. PATENT DOCUMENTS

| | | | |
|---|---|---|---|
| 2,272,842 | 2/1942 | Hickok | 358/87 |
| 3,320,359 | 5/1967 | Ikegami | 358/87 |
| 3,476,974 | 11/1969 | Turnage, Jr. et al. | 315/367 X |
| 3,803,445 | 4/1974 | Wagner | 315/393 |
| 3,889,155 | 6/1975 | Klingman | 315/367 X |
| 3,975,662 | 8/1976 | Janosky | 315/378 |
| 4,171,504 | 10/1979 | Strathman | 315/378 |
| 4,228,432 | 10/1980 | Osborne | 315/378 X |

*Primary Examiner*—Malcolm F. Hubler
*Attorney, Agent, or Firm*—Hubbard, Thurman, Turner, Tucker & Glaser

[57] ABSTRACT

A sweep generator for producing a circular raster of curved scanning lines on the target surface of a video camera is disclosed. Each curved trace follows a substantially circular path through a scanning angle of 360°. The circular raster is generated by horizontal and vertical scanning signals which are synchronized with the horizontal line frequency of a video receiver. The horizontal scanning signal is characterized by a constant amplitude component followed by a sine wave component, and the vertical scanning signal is characterized by a composite waveform including a constant amplitude component followed by a sine wave component which is shifted 90° in phase with respect to the sine wave of the horizontal scanning signal. The constant amplitude components of each composite waveform are synchronized with the horizontal blanking pulse which occurs during horizontal retrace of the scanning beam in the receiver, and the phase shifted sine waves are synchronized with the forward trace of each horizontal line in the receiver. This produces a one-to-one correspondence of each circular trace in the video camera with each horizontal forward trace in the receiver. The composite scanning signals are amplitude modulated by a sawtooth signal which is synchronized with the receiver field frequency, thereby producing a circular raster of concentric scanning lines. According to a preferred embodiment, each composite waveform is produced by a read only memory (ROM) which is synchronously cycled at the line frequency while driving a digital-to-analog converter. The modulating signal is generated by a sawtooth oscillator which is synchronized with the receiver field frequency.

8 Claims, 10 Drawing Figures

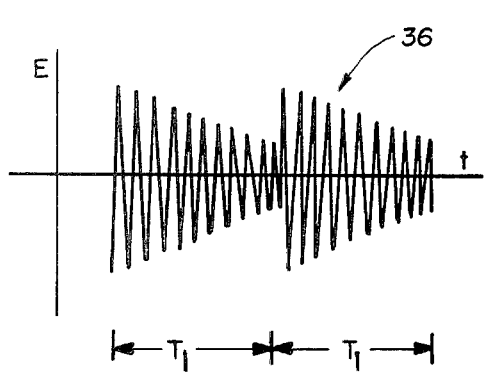
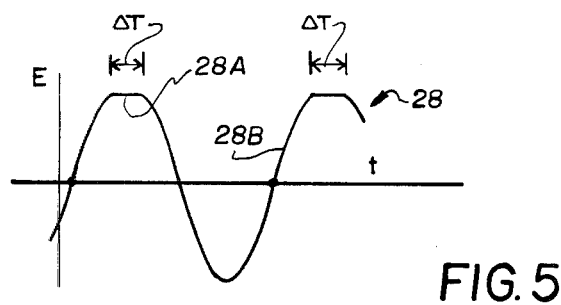
FIG. 5
FIG. 9
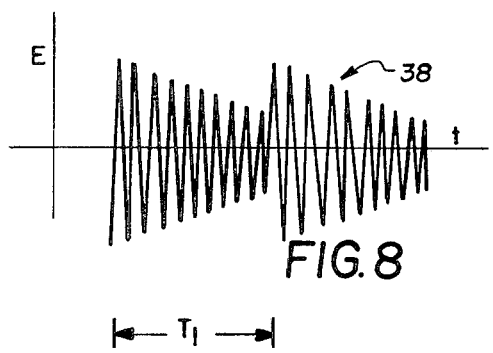
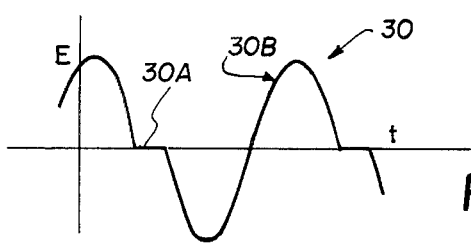
FIG. 4
FIG. 8
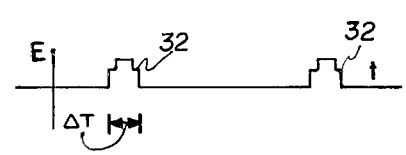
FIG. 3
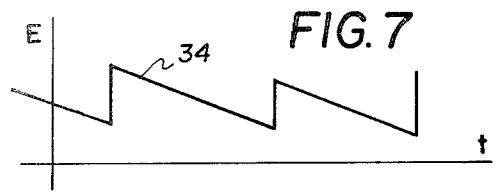
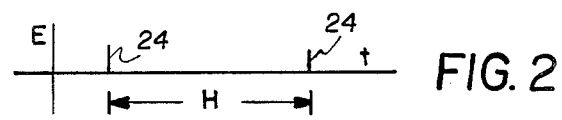
FIG. 2
FIG. 7
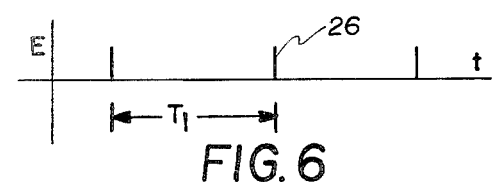
FIG. 6
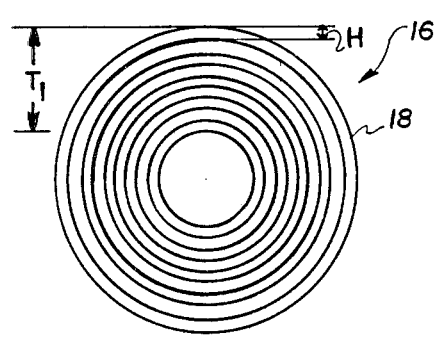
FIG. 10

CIRCULAR RASTER SWEEP GENERATOR

BACKGROUND OF THE INVENTION

1. Field of the Invention:

The present invention relates generally to video imaging systems, and in particular to a sweep generator for producing a circular raster of concentric curved traces on the target of a video camera.

2. Description of the Prior Art:

A widely used method for providing continuous surveillance over a predetermined area is by video transmission. The most elemental video surveillance system consists of a single camera permanently connected to a video monitor through a closed circuit transmission line. The video camera converts the virtual image of the area being scanned into electrical impulses which make up the video signal. In the surveillance of panoramic scenes it has been customary to use a single camera mounted on a support and capable of rotation about a vertical axis whereby a succession of images representative of the panoramic view are produced. In such systems the video camera is focused at successive points and therefore is incapable of viewing all points within the panoramic scene simultaneously.

There are a number of situations wherein it is desirable to provide simultaneous surveillance of a number of locations within one panoramic view. This objective has been accomplished by the use of multiple cameras and multiple receivers for covering various zones of interest. Complete acceptance and widespread use of the foregoing approach has been limited by the complexity and expense of equipment required to provide continuous surveillance of multiple locations. To minimize the equipment required, a panoramic optical lens has been developed which produces a virtual image of a panoramic view in the form of a continuous annular projection.

Although it is possible to scan the annular virtual image projected upon the target surface of a video camera according to a conventional horizontal scanning pattern, the image reproduced in the video receiver is an exact duplicate of the annular image and necessarily includes a central region of the raster surface of the video receiving tube which is unused. Additionally, in the annular image, a portion of the picture is inverted with respect to the panoramic view as normally observed. Therefore, in order to make efficient use of the raster surface of a single video picture tube, it is desirable to "spread" or transform the annular virtual image of the panoramic view into a rectangular image in which the complete panoramic view is portrayed without image inversion.

Various attempts have been made to sweep the scanning beam of the video camera along a spiral path and to supply video signals produced by the spiral scanning of the panoramic image to a video receiver for presentation in the horizontal lines of a rectangular raster. This approach has met with only limited success since the video signals corresponding with the portion of the virtual image scanned in the camera during the receiver retrace period are blanked out. Since the horizontal retrace period typically represents sixteen percent of the horizontal trace cycle, an angular sector measuring as much as 58° of the panoramic view will be lost.

OBJECTS OF THE INVENTION

It is, therefore, the principal object of the present invention to provide a sweep generator for scanning the target surface of a video camera along a curved path whereby video information corresponding with a complete panoramic view is preserved and reproduced in rectangular raster format in a video receiver.

A related object of the invention is to provide a sweep generator for driving the horizontal and vertical scanning circuits of a video camera to produce a scanning raster in the form of concentric, substantially circular traces wherein the circular traces in the video camera correspond on a one-to-one basis with horizontal scanning traces of a video receiver.

Yet another object of the invention is to provide a sweep generator for driving a scanning beam successively along concentric disjointed curved paths.

SUMMARY OF THE INVENTION

The problem of loss of video information during the receiver retrace period is overcome by driving the horizontal and vertical scanning circuits of the video camera with composite horizontal and vertical scanning signals each of which include a constant amplitude component which is synchronized with the horizontal blanking pulse which occurs during horizontal retrace of the scanning beam in the receiver. The composite horizontal and vertical scanning signals are characterized by a constant amplitude component followed by a sine wave component, with the component of one scanning signal being phase shifted by 90° with respect to the sine wave component of the other. The phase shifted sine and cosine wave components produce a circular trace which is synchronized with the forward trace of each horizontal line in the receiver. This produces a one-to-one correspondence of each circular trace in the video camera with each horizontal forward trace in the receiver. The composite scanning signals are amplitude modulated by a sawtooth signal which is synchronized with the receiver field frequency, thereby producing a circular raster of concentric scanning lines. The frequency of each composite waveform is equal to the horizontal line frequency in the receiver, and the duration of the constant amplitude component of each composite waveform is equal in duration to the horizontal line retrace interval.

According to this arrangement, a sweep generator is provided which includes first and second waveform generators for producing a circular raster of curved scanning lines on the target surface of a video camera. The interaction of the composite waveforms produces a scanning beam which is driven successively along concentric, disjointed curved paths. The scanning raster produced is in the form of an array of concentric, substantially circular traces which correspond on a one-to-one basis with the horizontal scanning traces of a video receiver. Because the circular traces are synchronized with the horizontal forward trace in the receiver, with generation of the circular trace being interrupted during the horizontal retrace interval, no video information is lost.

According to a preferred embodiment, each composite waveform is produced by a read only memory (ROM) which is synchronously cycled (read and reset) at the line frequency while driving a digital-to-analog converter. The composite scanning signals are amplitude modulated by a sawtooth signal which is synchronized with the receiver field frequency, thereby producing a circular raster of concentric scanning lines for scanning the annular virtual image projected upon a video target surface by a panoramic optical lens.

BRIEF DESCRIPTION OF THE DRAWING

FIG. 2 is a graphical representation of horizontal synchronizing impulses;

FIG. 3 is a graphical representation of horizontal blanking pulses;

FIGS. 4 and 5 are graphical representations of composite scanning signals which generate a circular raster of concentric traces;

FIG. 6 is a graphical representation of vertical synchronizing impulses;

FIG. 7 is a graphical representation of a sawtooth modulating waveform;

FIGS. 8 and 9 are graphical representations of the composite waveforms of FIGS. 4 and 5 which have been amplitude modulated by the sawtooth waveform of FIG. 7; and, FIG. 10 is a line diagram which illustrates a circular raster of concentric, disjointed curved paths produced during one sweep interval.

DETAILED DESCRIPTION OF THE PREFERRED EMBODIMENT

Figure 1:
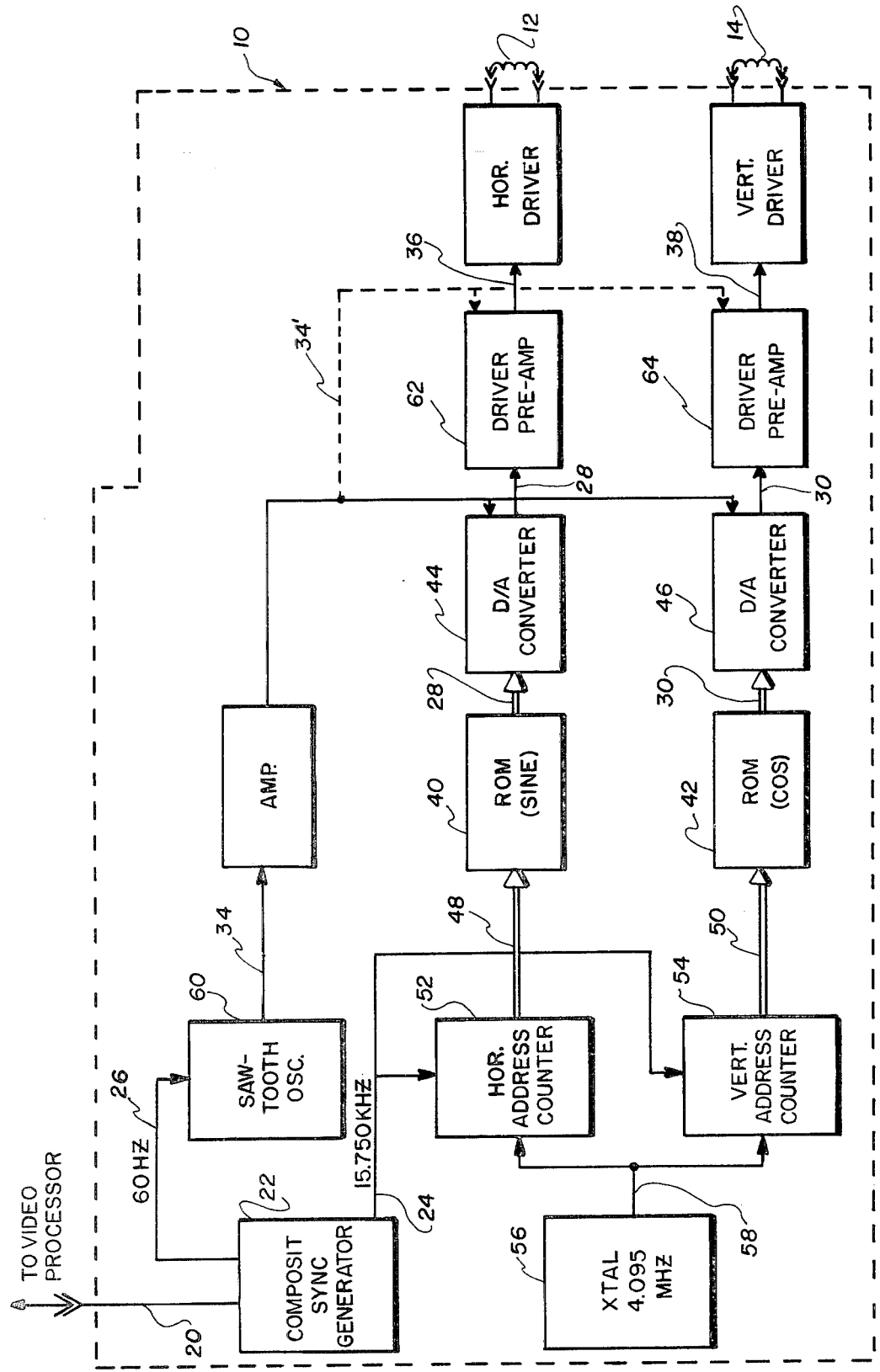
FIG. 1 is a block diagram of a circular raster sweep generator constructed according to the teachings of the invention.

In the description which follows, like parts are marked throughout the specification and drawing with the same reference numerals, respectively. The drawings are not necessarily to scale and in some instances portions have been exaggerated in order to more clearly depict certain features of the invention.

The best mode presently contemplated for practicing the invention is in combination with a vidicon camera tube. However, the sweep generator of the invention can be used to good advantage in combination with other optical transducers, for example the image orthicon, for producing a circular scanning raster.

Referring to FIG. 1, a circular raster sweep generator 10 is connected to the horizontal and vertical deflection coils 12, 14, respectively, of a vidicon camera tube (not shown). In the vidicon camera tube, an electrical image is produced by photoconduction, where the conductivity or resistance of a photosensitive target surface varies in proportion to the intensity of light focused onto the surface. The target consists of a transparent conducting film on the inner surface of a face plate and a thin photoconductive layer deposited on the film. Each cross sectional element of the photoconductive layer is an insulator in the absence of light, but becomes slightly conductive when it is illuminated. Such an element acts like a leaky capacitor, having one plate at the positive potential of the conductive film, and the other one floating. When light from the scene being televised is focused onto the surface of the photoconductive layer next to the face plate, each illuminated element conducts slightly, the current depending upon the amount of light reaching the element. This causes the potential of its opposite surface (the gun side) to rise toward the signal electrode potential. Hence, there appears on the gun side of the entire target surface a positive-potential replica of the scene composed of various element potentials corresponding to the pattern of light which is focused onto the photoconductive layer. When the gun side of the photoconductive layer, with its positive-potential replica, is scanned by an electron beam, electrons are deposited from the beam until the surface potential is reduced to that of the cathode of the gun. This action produces a change in the difference of potential between the two surfaces of element being scanned. When the two surfaces of the element, which in effect form a charge capacitor, are connected through the external target (signal electrode) circuit, a current is produced which constitutes the video signal. Deflection of the electron beam across the photoconductive layer is obtained by the external deflection coils 12, 14 within the focusing field.

For a panoramic camera lens which produces an annular virtual image, it is desirable to scan the vidicon target in a circular pattern as illustrated in FIG. 10. In FIG. 10, a circular raster 16 of curved scanning lines 18 are directed onto the target surface of a video camera. Each curved trace 18 follows a substantially circular path through a scanning angle of 360°. As the photoconductive layer of the vidicon camera target is scanned by the beam, electrical impulses are generated which make up the video signal which is amplified by a video modulator and RF amplifier circuit (not shown).

In order to keep the picture portrayed by the receiver in step with the scene at the transmitter, a composite sync signal 20 is produced by a generator 22 in the usual manner. The composite sync signal 20 includes conventional horizontal and vertical synchronizing pulses as well as equalizing pulses 24, 26, respectively for combination with the video signal prior to undergoing modulation and RF amplification. If anything other than a complete blur is to be obtained at the receiver, it is necessary that the number of lines per frame, and the number of frames per second be identical at the receiver and the transmitter. Also, identical synchronization pulses must be provided for the sweep circuits of the camera tube and at the picture tube in the receiver so that the electron beams of both tubes will have the same relative position at any given instant. Synchronization is assured by the composite sync signal 20 which includes both horizontal and vertical sync pulses.

Since one complete frame of a standard television picture consists of 525 horizontal lines and since thirty complete frames appear on the screen of the picture tube every second, then the electron beam must trace 525 times thirty, or 15,750 horizontal lines every second. The composite sync generator 22 produces a horizontal sync impulse signal 24 having a frequency of 15.750 KHZ and a vertical sync impulse signal 26 having a frequency of 60 HZ from which the horizontal and vertical sync pulses in the composite signal 20 are derived. The horizontal and vertical sync impulse signals 24, 26 are also used within the sweep generator 10 for synchronizing the generation of the circular scanning raster 16.

The resulting composite video information signal from the camera tube and the horizontal and vertical synchronizing and blanking pulses comprise the standard television signal for presentation on a horizontal raster. In horizontal scanning in the receiver, it is necessary for the scanning beam starting at the top of the screen to travel uniformly across the screen of the tube from left to right in response to a waveform of voltage or current applied to the horizontal deflecting plates or coils. As the beam moves from left to right across the screen, its intensity varies in accordance to the picture impulses applied to the picture tube grid, tracing one line of the picture across the screen. When the right edge of the screen is reached, the control grid of the picture grid is biased beyond cut-off and the spot is extinguished or blanked out while the electron beam is moved back to the left hand edge of the screen, placing it in position to trace another line of the picture. Extinguishing the beam at this time is called horizontal blanking or line blanking. The bias on the grid of the tube is then removed and the spot again moves across the screen from left to right as before.

After a certain number of horizontal lines have been traced in this way (one complete field), the control grid of the tube is biased to cut-off, and the beam is extinguished while it is being moved from the bottom to the top of the screen, placing it in position to start tracing the second field. The blanking of the beam at this time is called vertical blanking or field blanking.

Because the horizontal retrace period typically represents sixteen percent of the horizontal trace cycle, an angular sector measuring as much as 58° of the panoramic view will be lost in conventional spiral scanning arrangements. In such arrangements, the spiral scanning is continuous and the video signals corresponding with the portion of the virtual image scanned in the camera during the receiver retrace period are blanked out.

The problem of loss of video information during the receiver retrace period is overcome by driving the horizontal and vertical scanning circuits 12, 14 of the video camera with composite horizontal and vertical scanning signals 28, 30. The scanning signals each include constant amplitude components 28A, 30A, respectively, which are synchronized with the horizontal blanking signal 32 (FIG. 3) which occurs during horizontal retrace of the scanning beam in the receiver. Because of these constant amplitude components, the scanning beam 18 remains stationary on the vidicon target surface during the horizontal blanking interval with the result that video information is not generated during the blanking interval.

The horizontal and vertical scanning signals are composite signals, each including complete sine wave component 28B, 30B, respectively, which are phase shifted with respect to each other by 90°. The phase shifted sine wave components 28B, 30B produce the circular trace 18 which is synchronized with the forward trace of each horizontal line in the receiver. This produces a one-to-one correspondence of each curved trace 18 in the video camera with each horizontal forward trace in the receiver.

Referring to FIGS. 3, 4 and 5, it will be seen that the duration of the constant amplitude components 28A, 30A is equal to the duration of the horizontal blanking pulses 32, an interval designated as $\Delta T$. The interval between the leading edge of successive horizontal blanking pulses is designated as H. H represents the duration of one complete horizontal cycle, the time from the start of one line to the start of the next line, and is typically 63.5 microseconds. The blanking interval is typically sixteen percent of the total cycle, or approximately 10.16 microseconds ($\Delta T$).

By applying the composite horizontal and vertical scanning signals to the horizontal and vertical deflection coils 12, 14, the circular trace 18 is produced. In order to scan the entire annular image, the composite horizontal and vertical scanningsignals 28, 30 are amplitude modulated by a sawtooth signal 34 which is synchronized with the vertical sync impulses 26. The frequency of the impulses 26, and of the sawtooth signal 34, is 60 HZ. The total duration $T_1$ of one complete cycle of the vertical sawtooth waveform is approximately 16,667 microseconds as compared to only 63.5 microsecond duration of one complete horizontal cycle, thereby allowing the scanning beam to go through 262.5 complete cycles during the time required for one complete cycle of the vertical sawtooth waveform 34. Each successive curved trace 18 produced in response to the sawtooth modulating waveform 34 has a relatively smaller diameter, thereby producing a circular raster of disjointed, concentric curved traces. Each curved trace 18 approximates a circular path, but in practice comprises a segment of a spiral since the modulating sawtooth waveform 34 diminishes slightly by approximately three-tenths of one percent during the generation of each curved trace 18.

After undergoing modulation, the composite scanning signals 28, 30 take on the modulated waveforms 36, 38 as illustrated in FIGS. 8 and 9. The frequency of each composite waveform is equal to the horizontal line frequency in the receiver, and the duration of the constant amplitude component of each composite waveform is equal in duration to the horizontal line retrace interval. The composite scanning signals are then amplitude modulated by the sawtooth signal 34 which is synchronized with the receiver field frequency, thereby producing the circular raster of 16 of concentric scanning lines 18. The interaction of the composite waveforms produces a scanning beam which is driven successively along concentric, disjointed curved paths. The scanning raster 16 is produced in the form of an array of concentric, substantially circular traces which correspond on a one-to-one basis with the horizontal scanning traces of a video receiver. Because the circular traces are synchronized with the horizontal forward trace of the receiver, with generation of the circular trace being interrupted during the horizontal retrace interval, no video information is lost.

Referring again to FIG. 1, each composite waveform is produced preferably by a programmed logic array such as a read only memory (ROM) 40, 42, respectively, which is synchronously cycled (read and reset) at the line frequency while driving a digital-to-analog converter 44, 46, respectively. Each ROM is pre-programmed to produce the composite waveforms 28, 30, respectively, with the generation of the constant amplitude components being synchronized with the horizontal sync impulses 24, and with the sine wave components being in proper phase relationship (90°) for producing a circular scan. The outputs (28', 30') of each ROM is preferably an eight bit word which is representative of one discrete portion of the composite waveform which corresponds to address signals 48, 50, respectively. The address signals 48, 50 each produce eight bit words in response to horizontal address counters 52, 54, respectively, which are driven by a clock generator 56 at a rate of 4.095 MHZ. The clock generator 56 has a crystal oscillator of a frequency which is an integral multiple (256) of the horizontal line frequency whereby each composite waveform is divided into 256 increments during each period H. It should be apparent that the composite waveform could be further subdivided to provide a more precise sine waveform if desired. It is preferable, however, that the crystal frequency be an integral multiple of the line frequency so that a complete scanning circle will be generated during each horizontal line scan.

The output of the crystal oscillator 56 is a clock signal 58 which occurs at the rate of 4.095 MHZ. The horizontal and vertical address counters 52, 54 generate a sequence of eight bit digital data word addresses which change in response to each clock pulse. The horizontal and vertical address counters 52, 54 are reset at a rate of 15.75 KHZ by the horizontal sync impulse signal 24. Address decoders (not shown) within each ROM chip perform the necessary address functions. In this embodiment, exactly 256 word addresses are generated by the address counters, with the result that exactly 256 eight bit words (28', 30') are read from each ROM 40, 42 during each read cycle. Therefore, each composite waveform is generated in synchronous relation with the horizontal line cycle in the receiver. Since the constant amplitude waveform components are synchronized with the horizontal sync impulses, and since they are pre-programmed to be of equal duration ($\Delta T$) with respect to the blanking pulse duration, no video information will be lost during the horizontal blanking interval.

The sawtooth modulating waveform 34 is produced by a sawtooth oscillator 60 which is triggered by the 60 HZ vertical sync impulse signal 26. The amplified sawtooth waveform 34 is then applied as a bias voltage, preferably to the digital-to-analog converters 44, 46, to produce the amplitude modulated scanning waveforms 36, 38. However, it is apparent that the sawtooth modulating signal 34 could also be applied to the driver preamps 62, 64, respectively, as indicated by the dashed line 34'. The composite scanning signals are thereby amplitude modulated by the sawtooth signal, which is synchronized with the receiver field frequency, thereby producing a circular raster of concentric scanning lines for scanning the annular virtual image projected upon a video target surface by a panoramic optical lens.

The present preferred embodiment should be considered in all respects as illustrative and restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A sweep generator for driving the horizontal and vertical scanning circuits of a video camera in synchronous relation with horizontal and vertical sync signals, said sweep generator comprising:
    a first waveform generator coupled to the horizontal sync signal for generating a horizontal scanning signal in synchronous relation with the horizontal sync signal, each cycle of the horizontal scanning signal being characterized by a composite waveform including a constant amplitude component followed by a sine wave component;
    a second waveform generator coupled to the horizontal sync signal for generating a vertical scanning signal in synchronous relation with the horizontal sync signal, each cycle of the vertical scanning signal being characterized by a composite waveform including a constant amplitude component followed by a sine wave component which is phase shifted with respect to the sine wave component of the horizontal scanning signal; and,
    a sawtooth oscillator coupled to the vertical sync signal for generating of a sawtooth modulating waveform signal in synchronous relation with the vertical sync signal, said sawtooth oscillator being coupled to said first and second waveform generators for amplitude modulating the horizontal and vertical scanning signals.

2. The sweep generator as defined in claim 1, the first and second waveform generators each comprising a programmed logic array having data stored in predetermined address locations which correspond with discrete amplitude values of the horizontal and vertical scanning signals, respectively; means coupled to each programmed logic array for addressing the data stored in each predetermined address location; and, a digital-to-analog converter coupled to each programmed logic array for generating an analog signal having an amplitude corresponding to said discrete amplitude values.

3. The sweep generator as defined in claim 2, said addressing means comprising a crystal controlled clock pulse generator for generating a clock signal and a counter coupled to the clock pulse generator for generating a plural bit digital data address word corresponding to its count in response to each clock pulse.

4. The sweep generator as defined in claim 3, including a generator for producing a horizontal sync signal coupled to the address counter for resetting the address counter upon the count of a predetermined number of clock pulses.

5. A sweep generator for driving a video scanning beam successively along concentric, disjointed curved paths comprising, in combination:
    a trigger signal generator for providing first and second trigger signals, the first trigger signal having a predetermined frequency corresponding with the horizontal sweep frequency of a video receiver and the second trigger signal having a predetermined frequency corresponding with the vertical sweep frequency of the video receiver;
    a first read only memory (ROM) having data stored in predetermined address locations which correspond with discrete amplitude values of a first composite waveform characterized by a constant amplitude component and a sine wave component;
    a second read only memory (ROM) having data stored in predetermined address locations which correspond with discrete amplitude values of a second composite waveform characterized by a constant amplitude component and a sine wave component which is phase shifted with respect to the sine wave component of the first composite waveform;
    an address counter coupled to each read only memory (ROM) for addressing the data stored in each predetermined address location, each address counter being coupled to the trigger signal generator for resetting its count in response to each pulse of the first trigger signal;
    a digital-to-analog converter coupled to each read only memory (ROM) for generating first and second analog scanning signals each having an amplitude corresponding to said discrete amplitude values, respectively; and,
    a sawtooth oscillator coupled to the trigger signal generator for generating a sawtooth modulating waveform in synchronous relation with the second trigger signal, said sawtooth oscillator being coupled to each digital-to-analog converter for amplitude modulating the first and second analog scanning signals.

6. A method for driving the horizontal and vertical scanning circuits of a video camera comprising the steps:
generating a horizontal scanning signal characterized by a composite waveform including a constant amplitude component followed by a sine wave component;
generating a vertical scanning signal characterized by a composite waveform including a constant amplitude component followed by a sine wave component which is phase shifted with respect to the sine wave component of the horizontal scanning signal; and,
amplitude modulating the composite horizontal and vertical scanning signals with a sawtooth waveform; and,
applying the amplitude modulated composite scanning signals to the horizontal and vertical scanning circuits, respectively.

7. The method as defined in claim 6, the frequency of each composite waveform being equal to the horizontal sweep frequency of a video receiver, each constant amplitude waveform being substantially co-incident in time and equal in duration to the horizontal retrace interval in the receiver, and the sawtooth amplitude modulating waveform having a frequency equal to the vertical sweep frequency of the receiver.

8. A method for driving a video scanning beam successively along concentric, disjointed curved paths comprising the steps:
generating first and second trigger signals having a frequency corresponding with the horizontal sweep frequency and vertical sweep frequency of a video receiver, respectively;
generating a clock signal at a frequency which is an integral multiple of the horizontal sweep frequency;
applying the clock signal to the input of first and second address counters;
generating first and second plural bit address words corresponding to the count of each address counter in response to each clock pulse;
resetting each address counter in synchronous relation with the first trigger signal;
applying the plural bit address words to the decoder input of first and second read only memories, respectively, each memory having data stored in predetermined address locations which correspond with discrete amplitude values of first and second composite scanning waveforms, respectively, wherein each composite waveform is characterized by a constant amplitude component and a sine wave component;
generating first and second plural bit data output words in response to the first and second address words, respectively, which are representative of discrete amplitude values of the first and second composite scanning waveforms, respectively;
converting each plural bit data output word to first and second analog scanning signals each having an amplitude corresponding to the discrete amplitude values of each word, respectively;
generating a sawtooth modulating waveform in synchronous relation with the second trigger signal; and,
amplitude modulating the first and second analog scanning signals with the sawtooth waveforms.

* * * * *